(12) United States Patent
Jaatinen et al.

(10) Patent No.: US 7,953,376 B2
(45) Date of Patent: May 31, 2011

(54) SYNCHRONIZATION METHOD FOR DISCONTINUOUS TRANSMISSIONS IN A COMMUNICATIONS NETWORK

(75) Inventors: Jussi Jaatinen, Helsinki (FI); Karri Rantaaho, Espoo (FI)

(73) Assignee: Nokia Corporation, Espoo (FI)

( * ) Notice: Subject to any disclaimer, the term of this patent is extended or adjusted under 35 U.S.C. 154(b) by 1181 days.

(21) Appl. No.: 11/425,256

(22) Filed: Jun. 20, 2006

(65) Prior Publication Data

US 2007/0293162 A1    Dec. 20, 2007

(51) Int. Cl.
*H04B 1/40* (2006.01)
(52) U.S. Cl. .......................................... 455/84; 370/331
(58) Field of Classification Search .................. None
See application file for complete search history.

(56) References Cited

U.S. PATENT DOCUMENTS

| | | | |
|---|---|---|---|
| 6,747,963 B1 | 6/2004 | Park et al. | |
| 2005/0221833 A1* | 10/2005 | Granzow et al. | 455/450 |
| 2006/0256757 A1* | 11/2006 | Kuusela et al. | 370/335 |

FOREIGN PATENT DOCUMENTS

| | | |
|---|---|---|
| CN | 1290431 A | 4/2001 |
| WO | WO 00/35126 A | 6/2000 |

OTHER PUBLICATIONS

Office Action dated Dec. 30, 2009 and issued in connection with corresponding European Patent Application No. 07 734 495.0; 6 sheets.
*Continuous Connectivity for Packet Data Users; Opportunities for Resource Saving in the Node B Receiver*, 3GPP TSG-RAN WG1 Meeting #43, Oct. 11, 2005, 2 pages.
*3rd Generation Partnership Project; Technical Specification Group Radio Access Network; Continuous Connectivity for Packet Data Users*; 3GPP TR 25.903 VO. 4.0, Apr. 2006, 79 pages.
Office Action from related Chinese Patent Appl. No. 200780023121. 6, dated Sep. 21, 2010.

* cited by examiner

*Primary Examiner* — Phuoc Doan
(74) *Attorney, Agent, or Firm* — Alston & Bird LLP

(57) ABSTRACT

A method of providing assistance for synchronization of a radio link in a communications network comprising at least a first network element, the method comprising the steps: making a decision to connect a user equipment to the first network element via a first radio link to transmit a signal discontinuously thereto; transmitting the signal continuously from the user equipment to the first network element via the first radio link; synchronizing the first radio link; and switching the user equipment to transmit the signal discontinuously after the first radio link is synchronized.

43 Claims, 2 Drawing Sheets

SYNCHRONIZATION METHOD FOR DISCONTINUOUS TRANSMISSIONS IN A COMMUNICATIONS NETWORK

FIELD OF THE INVENTION

Embodiments of the present invention relate to a method of performing a soft handover in a telecommunications network and in particular to a method of synchronizing a new radio link when performing a soft handover addition.

BACKGROUND OF THE INVENTION

A communication system is a facility which enables communication between two or more entities such as user terminal equipment and/or network entities and other nodes associated with a communication system. The communication may comprise, for example, communication of voice, electronic mail (email), text messages, data, multimedia and so on.

The communication may be provided by a fixed line and/or wireless communication interface. A feature of wireless communication systems is that they provide mobility for the users thereof. An example of communication systems providing wireless communication are public land mobile networks (PLMN). An example of the fixed line system is a public switched telephone network (PSTN). A communication system can also comprise a plurality of wireless interfaces and access technologies, such that a terminal can be configured to be capable of communicating with the communication system using one or several of said plurality of access technologies at a given time. Examples of such access technologies and corresponding wireless interfaces include, but are not limited to, WLAN, WCDMA, CDMA2000, EDGE, Bluetooth, HiperLAN, WIMAX and digital satellite communications.

A communication system typically operates in accordance with given standards or specifications which set out what the various elements of a system are permitted to do and how that should be achieved. For example, the standards or specifications may define if the user or more precisely the user equipment is provided with a circuit switched service or a packet switched service or both.

Communication protocols and/or parameters which should be used for the connection are also typically defined. For example, the manner in which communication should be implemented between the user equipment (UE) and the elements of the communication network is typically based on predefined communication protocols. In other words, a specific set of "rules" on which the communication can be based needs to be defined to enable the user equipment to communicate via the communication system.

So called third generation communication systems are being introduced. These so called third generation systems typically use Code Division Multiple Access (CDMA) techniques such as Wideband Code Division Multiple Access (WCDMA).

In certain third generation systems base stations are referred to as Node Bs. Node Bs (or base stations) are arranged to communicate via a wireless interface with user equipment. The Node Bs are connected to Radio Network Controllers (RNCs). RNCs and Node Bs make a UMTS Terrestrial Radio Access Network (UTRAN).

The node Bs are responsible for scheduling the radio transmissions of certain channels such as the High Speed Downlink Shared Channel (HSDSCH) and Enhanced Uplink Dedicated Channels (EDCH).

Soft Handover (SHO) refers to a feature used by the CDMA standard, where a user equipment is simultaneously connected to two or more Node Bs during a communications session. This technique is a form of mobile-assisted handover for CDMA user equipment. The user equipment makes various signal quality/power measurements of a neighbouring Node Bs, and determines whether or not to add or remove the Node Bs from an active set to which the user equipment is connected. This is known as soft handover addition/deletion. The active set is a list of Node Bs held in the user equipment indicating which Node Bs the user equipment has an active radio link with. The user equipment can send signals to, and receive signals from, the Node Bs in the active set during a communication session.

Due to the properties of the CDMA signalling scheme, it is possible for a CDMA user equipment to simultaneously receive signals from two or more nodes that are transmitting the same bit stream on the same channel. If the signal power from two or more nodes is nearly the same, the user equipment can combine the received signals in such a way that the bit stream is decoded much more reliably than if only one base station were transmitting to the user equipment. If any one of these signals fades significantly, there will be a relatively high probability of having adequate signal strength from one of the other nodes.

On the "reverse" link or uplink (user equipment to Node B), all the Node Bs that are actively supporting a communications session in soft handover send the bit stream that they receive back to the RNCs, along with information about the quality of the received bits. The RNC examines the quality of all these bit streams and dynamically chooses the bit stream with the highest quality. Again, if the signal from one Node-B degrades rapidly, the chances are still good that a strong signal will be available at one of the other Node Bs that is supporting the call in soft handover.

The transmissions sent between the user equipment and the plurality of Node Bs to which it is connected in soft handover must be synchronized (soft handover synchronization). A Node B is synchronized when it is added to the active set.

Methods of synchronization are known in the art. However, a problem with known arrangements is that synchronization is difficult for non-continuous transmissions.

In $3^{rd}$ Generation Partnership Project 3GPP) Technical Document R1-051448 published by Ericsson on 1 Nov. 2005 (which is incorporated herein by reference), opportunities for resource saving in the Node B receiver are discussed. It is stated that in the concept UL DPCCH Gating (Uplink Dedicated Physical Control Channel Gating), the start positions for the transmissions during packet traffic activity can be restricted to certain subframes/frames, for example to the subframes/frames given by the periodic DPCCH transmission pattern. The allowed start positions must of course be rather frequent in order not to introduce unacceptable delays. This would decrease the receiver resource needs significantly. It would also eliminate the need to continuously detect the presence of DPCCH as the receiver would know in advance when the transmission will take place. The document states further that when a radio link is added to the active set during soft handover addition (sync procedure B), it would be beneficial to transmit the DPCCH continuously until the new radio link has been successfully added. If the DPCCH signal is discontinuous, it is harder for the Node B to obtain uplink synchronisation and hence there is a risk that Node B needs to spend more time and/or more resources before it can declare that soft handover synchronization has been achieved. Notably the same solution would be beneficial in all cases when a Node B is establishing the uplink synchronisation, soft handover being just one example of this.

Thus, it has been recognized that discontinuous DPCCH transmission can save resources in the Node B. However, the provision of discontinuous DPCCH makes it difficult to perform the uplink synchronisation in the Node B to which the new radio link is being added. This need occurs for soft handover synchronization as well as during the initial radio link synchronisation when the radio link is being set up for the first time or the UE is performing a hard handover, i.e. a handover in which the old radio links are deleted and (a) new one(s) added. The new Node B synchronizing to the transmission of the uplink signal faces the same uplink synchronisation acquisition problem regardless of whether a hard handover, a new soft handover link or an initial connection is being performed. One solution to this problem would be to provide continuous DPCCH transmission always. However, this would result in a heavy signalling burden on the Node B and render the proposed enhancement of gating the uplink DPCCH useless.

The present invention aims to solve the aforementioned problems.

SUMMARY OF THE INVENTION

The present inventors have recognized that it is beneficial to provide discontinuous DPCCH transmission but that this causes problems with synchronization. Accordingly, the present inventors propose to solve this problem by switching between discontinuous DPCCH transmission and continuous DPCCH transmission during the synchronization procedure and then switching back to discontinuous DPCCH transmission after synchronization is complete. Furthermore, the present inventors have realized that this technique can be used generally for discontinuous transmissions which are required to be synchronized, not just in the case of DPCCH.

In light of the above, according to a first aspect of the present invention there is provided a method of providing assistance for synchronization of a radio link in a communications network comprising at least a first network element, the method comprising the steps: making a decision to connect a user equipment to the first network element via a first radio link to transmit a signal discontinuously thereto; transmitting the signal continuously from the user equipment to the first network element via the first radio link; synchronizing the first radio link; and switching the user equipment to transmit the signal discontinuously after the first radio link is synchronized.

Preferably, the communications network comprises a second network element, the user equipment being connected to the first network element via the first radio link and wherein a decision is made to connect the user equipment to the second network element via a second radio link to transmit the signal thereto, wherein the user equipment begins transmitting the signal continuously, the second radio link is synchronized, and then the user equipment switches to transmit the signal discontinuously after the second radio link is synchronized.

The present invention provides a method of synchronizing a new radio link from a discontinuous uplink signal by transmitting the uplink signal continuously during the synchronization procedure and then switching back to discontinuous transmission after synchronization. The present invention takes into account that synchronizing a new radio link from a discontinuous uplink transmission is more difficult than from a continuous uplink transmission but that it is advantageous to provide discontinuous transmission to save resources in the network elements. The present invention allows easier synchronization while providing the advantages of discontinuous transmission by providing discontinuous transmission but switching to continuous transmission for the synchronization procedure and then switching back to discontinuous transmission thereafter.

More specific embodiments of the present invention relate to WCDMA—uplink synchronization with uplink DPCCH gating. Uplink DPCCH gating introduces the possibility for discontinuously transmitted uplink DPCCH. In earlier 3GPP standard releases, the DPCCH uplink has always been continuous. Synchronization of a new radio link from a discontinuous DPCCH uplink is more difficult than from a continuous DPCCH uplink. Embodiments of the present invention propose to transmit DPCCH continuously only during the synchronisation phase.

Certain embodiments of the present invention facilitate synchronization in connection with discontinuous DPCCH and SHO. It is possible that the initial synchronization via discontinuous DPCCH would be challenging to accomplish otherwise, since the processes (and Node-Bs) have originally been designed for "monoblock" impulse response measurements (IRM) and various time-out and resource utilization algorithms might have to be altered. It is also possible that Node-Bs of at least some manufacturers would need hardware changes to cope with the IRM otherwise.

IRM measurements search a received signal with a correlator for a known sequence. When a reliable maximum of the correlation is detected, it may be decided that the maximum corresponds to a received signal component in the receiver and detecting resources may be allocated to the delay value corresponding to the said maximum correlation. This process is called synchronization (but synchronization may in some embodiments also be accomplished in other ways). Typically the integration time for IRM measurements is long, and the correlators are relatively scarce resources. Thus if the transmission is discontinuous, it would become necessary to shuffle the correlator resources between various tasks in a manner inconsistent with the above-mentioned "monoblock" mode for which the systems were originally designed.

The same behaviour could be achieved by turning the discontinuous DPCCH mode off before adding new radio links to the active set of the UE and on again when synchronization has been established.

Moving from one mode to another can be triggered by the network or UE in various embodiments. For example, in a simple embodiment the UE can start transmitting a continuous DPCCH transmission when a new radio link is being set-up, and move back to the discontinuous mode once time-out counters expire, or once it has an indication that the new radio link has been successfully synchronized. In other embodiments, the RNC will issue directives to change the UE behaviour from one mode to another using the existing radio link. In yet another embodiment, the UE will detect from the downlink physical channel signal sent by the Node B that the new radio link has been successfully synchronised. In yet further embodiments the network or UE can determine various cost/benefit analyses to determine how, and for how long, the DPCCH pattern should be changed to trade-off the noise rise and synchronization efficiency in an optimal way depending on, for example, the delay requirements of services the UE is currently using and the overall noise rise or radio channel situation.

The user equipment may monitor network elements for signal quality and add or remove a network element from the active set according to the signal quality based on decisions made by the communications network. That is, the UE may report these measurements to the network and the network makes the decision to add/remove radio links and communicates this to the UE.

Embodiments of the present invention introduce a period of continuous DPCCH transmission from the UE for situations where an initial synchronization is performed in the Node B. When a new Node-B is added to the active set in soft handover mode, the RNC signals the UE via the existing radio links to transmit a continuous burst of DPCCH of configurable duration, or until the new radio link is established.

According to another aspect of the present invention there is provided a method of providing assistance for synchronization of radio links in a communications network comprising at least a first and second network element, wherein a user equipment is connected via a first radio link to the first network element to transmit a signal discontinuously thereto and a decision is made to connect the user equipment to the second network element via a second radio link to transmit the signal thereto, wherein the user equipment begins transmitting the signal continuously, the second radio link is synchronized, and then the user equipment switches to transmit the signal discontinuously after the second radio link is synchronized.

According to another aspect of the present invention there is provided a method of providing assistance for synchronization of radio links in a communications network comprising at least a first and second network element, wherein a user equipment is connected via a first radio link to the first network element to transmit a signal discontinuously thereto and a decision is made to connect the user equipment to the second network element via a second radio link to transmit the signal thereto, wherein the user equipment begins transmitting the signal continuously, the second radio link is synchronized, and then the user equipment switches to transmit the signal discontinuously after the second radio link is synchronized, wherein the decision is to expand an active set by adding a link to the second network element, wherein an active set update message is sent to the user equipment when the decision is made, and wherein the user equipment transmits the signal continuously for a predetermined time in response to the active set update message.

According to another aspect of the present invention there is provided a method of providing assistance for synchronization of a radio link in a communications network comprising at least a first network element, the method comprising the steps: making a decision to connect a user equipment to the first network element via a first radio link to transmit a signal utilizing a second transmission pattern thereto; transmitting the signal utilizing a first transmission pattern from the user equipment to the first network element via the first radio link; synchronizing the first radio link; and switching the user equipment to transmit the signal using the second transmission pattern after the first radio link is synchronized.

Preferably, the communications network comprises a second network element, the user equipment being connected to the first network element via the first radio link and wherein a decision is made to connect the user equipment to the second network element via a second radio link to transmit the signal thereto, wherein the user equipment switches to transmit the signal utilizing the first transmission pattern, the second radio link is synchronized, and then the user equipment switches to transmit the signal utilizing the second transmission pattern after the second radio link is synchronized.

According to one set of embodiments, the DPCCH is not made continuous but the transmitting pattern is modified to make synchronization easier. Such a pattern may be, for example, one where the DPCCH is transmitted for a larger fraction of time than in the original pattern. For example, the second transmission pattern may be a discontinuous signal and the first transmission pattern may be a discontinuous signal with a greater transmission length and/or frequency. In the extreme case, the first transmission pattern is a continuous signal.

According to another aspect of the present invention there is provided a communications network comprising at least a first network element, the communications network being adapted to: make a decision to connect a user equipment to the first network element via a first radio link to transmit a signal discontinuously thereto; send a message to the user equipment to transmit the signal continuously from the user equipment to the first network element via the first radio link; synchronize the first radio link; and receive the signal discontinuously after the first radio link is synchronized.

According to another aspect of the present invention there is provided a network entity for use in a communications network, the network entity being adapted to: make a decision to connect a user equipment to a network element via a radio link to transmit a signal discontinuously thereto; and send a message to the user equipment to transmit a continuous burst of signal of configurable duration to the network element or until the radio link is established.

Preferably, the network entity is adapted to send a message to the user equipment to switch to transmit the signal discontinuously after the radio link is synchronized.

According to another aspect of the present invention there is provided a user equipment for use in a communications network comprising a first network element, the user equipment being adapted to: receive a message from the communications network to set up a first radio link with the first network element; transmit a signal continuously from the user equipment to the first network element via the first radio link while the first radio link is being synchronized; and switch to transmit the signal discontinuously after the first radio link is synchronized.

According to other aspects of the present invention there is provided a computer program and a computer program product for carrying out the method of the present invention.

BRIEF DESCRIPTION OF THE DRAWINGS

For a better understanding of the present invention and as to how the same may be carried into effect, reference will now be made by way of example only to the accompanying drawings in which.

DETAILED DESCRIPTION

Figure 1:
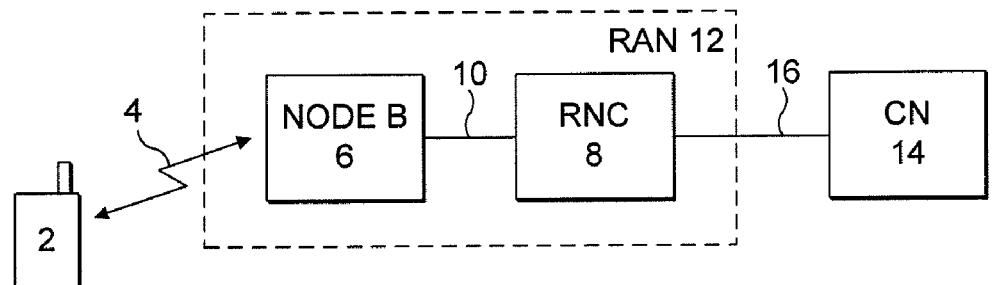
FIG. 1 schematically shows a network in which embodiments of the present invention can be incorporated.

FIG. 1 schematically shows a network in which embodiments of the present invention can be incorporated. The network illustrated in FIG. 1 is a so called third generation network operating in accordance with the 3GPP (third generation partnership project) standard. It should however be appreciated that embodiments of the present invention can be used in conjunction with systems operating in accordance with other third generation standards or indeed any other suitable standard or access technology. Examples of such access technologies include, but are not limited to, WLAN, WCDMA, CDMA2000, EDGE, Bluetooth, HiperLAN, WIMAX and digital satellite communications, and systems that comprise several access technologies.

User equipment 2 is provided. The user equipment can take any suitable form and can be for example a mobile telephone, personal computer, personal organiser, PDA (Personal Data Assistant) or any other suitable user equipment. The user equipment 2 is arranged to communicate via a wireless connection 4 with a Node B 6. A Node B is sometimes referred to as a base station. The term Node B is intended to cover base stations. In practice, a single Node B 6 is arranged to communicate with a number of different user equipment at the same time. Typically, a Node B 6 is associated with a given area, and user equipment in that area may communicate with that Node B. In some circumstances, user equipment can be in communication with more than one Node B at a given time, such as in soft handover mode. In some situations, more than one Node B can be associated with a given area. Another example of a case where a user equipment can be in communication with more than one Node-B, or more generally, access node, is when the user equipment is communicating simultaneously e.g. with a Node-B according to the WCDMA standard and with a WLAN access node according to the WLAN standards.

The Node B 6 is connected to a radio network controller, RNC 8, via a connection 10. This connection is referred to as the Iub interface. The connection is usually a wired connection. The RNC 8 is arranged to control the Node B. In practice, a given RNC 8 will be arranged to control a number of different Node Bs. At least one Node B 6 and the associated RNC(s) 8 together define a radio access network, RAN 12.

The RAN 12 is connected to a core network, CN 14. The connection between the CN 14 and the RAN 12 is via the RNC 8 and the connection 16 therebetween. The core network is well known by the man skilled in the art and will not be described in any further detail.

Figure 2:
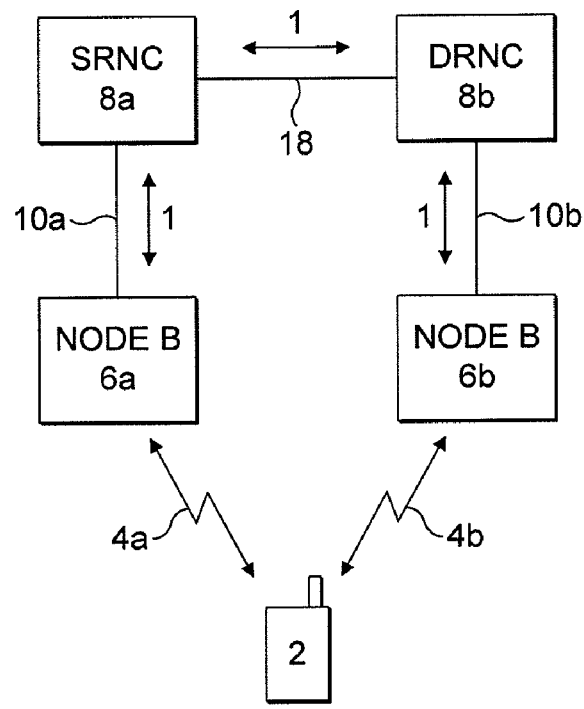
FIG. 2 schematically shows message flow between radio network controllers, node Bs, and a user equipment.

Reference is now made to FIG. 2 which shows elements of a radio access network 12 in more detail.

In the arrangement shown in FIG. 2, there is a first node B 6a and a second node B 6b. The first node B 6a is connected via Iub interface 10a to a serving radio network controller, SRNC 8a, which in turn is connected to a drift radio network controller, DRNC 8b. The connection between the serving radio network controller and the drift radio network controller is via a connection 18, referred to as a Iur interface. The second node B 6b is connected via Iub interface 10b to DRNC 8b. The serving RNC and the drift RNC are roles the RNC can take with respect to a specific connection between a UE and UTRAN.

When a mobile station of user equipment moves from one cell to a new cell, the base station or node B associated with the new cell may be controlled by a different RNC. This is referred to as the target RNC and the original RNC is referred to as the source RNC. Node B referenced 6a is the node B which is initially arranged to communicate with the user equipment while the node B referenced 6b is the node B with which the user equipment is now associated.

Two situations can arise. In the first situation, control of the mobile station is retained by the source RNC 8a and traffic is routed via the target RNC (i.e. DRNC 8b) to the source RNC 8a using the inter-RNC interface, i.e. the Iur interface. The connection to the source RNC is therefore maintained and control of communications is also maintained by the source RNC. This procedure is commonly referred to as anchoring.

In the second situation, control of the mobile station by the source RNC is released and control of communications is transferred completely to the target RNC associated with the cell where the mobile station has moved to. The target RNC thus becomes the new source RNC after communication has been transferred. This procedure is referred to as serving radio network subsystem (SNRS) relocation.

In FIG. 2, signalling referenced 1 indicates node synchronization. In soft handover mode, the user equipment 2 can communicate with both Node Bs via first and second radio links 4a, 4b.

Detailed examples of various soft handover procedures including radio link addition, radio link deletion, simultaneous radio link addition/deletion, and mobility procedures are given in technical specifications corresponding to each radio link and access technology. These documents also describe various EDCH specific soft handover procedures for the WCDMA case.

Embodiments of the present invention can be utilized in the above-identified soft handover procedures. In fact, embodiments of the present invention can be utilized in any signalling procedures where it would be advantageous to utilize a discontinuous transmission but synchronization is required.

Embodiments of the present invention relate to packet data users, and in particular EDCH users, that are continuously connected to the network with only occasional periods of activity. In continuously connected mode, the users do not relinquish their data channels during periods of inactivity only to re-establish them when traffic is available—this would create delays that would ruin the user experience. In order to allow for a large number of such users, the UEs are configured to discontinue their DPCCH transmissions ("gating") when not sending data. Users can, for example, transmit one 2 ms TTI (Transition Time Interval) of data with the DPCCH, or the DPCCH only, every 2-5 frames and nothing in between (i.e. no DPCCH during the transmission gaps). Thus, if there is no data to send, the DPCCH transmission is periodic for synchronisation maintenance and power control purposes only. If there is only a small amount of data to be delivered then it can be sent during these short periods of DPCCH activity. If there is more data to be sent, then the discontinuity of the DPCCH transmission can be adapted such that the data can be delivered, e.g. by extending the length of the transmissions or by increasing the frequency of the transmissions.

In addition to noise-rise gains from using discontinuous DPCCH transmission (in the uplink) the scheme presents several challenges. One of them is synchronization (finger allocation in connection with radio link setup). In continuous DPCCH, a long channel IRM is conducted in the Node-B to raise channel taps from noise by integrating over time. In the discontinuous DPCCH mode, the corresponding initial sync IRM would be extended temporally by a factor of 1/(activity factor). This presents challenges both from the IRM correlator resource management point-of-view and the physical situation: the channel taps can move during the measurement, making the exercise moot.

Figure 3:
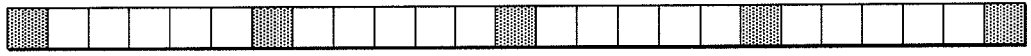
FIG. 3 shows a discontinuous DPCCH transmission.

FIG. 3 illustrates a discontinuous DPCCH transmission. A receiver can only synchronize to the DPCCH that is actually transmitted. This is a time domain Figure in which the darkened portions indicate DPCCH transmission and the white portions indicate no DPCCH transmission. In 3GPP Release 6 and earlier releases the DPCCH is transmitted continuously.

Figure 4:
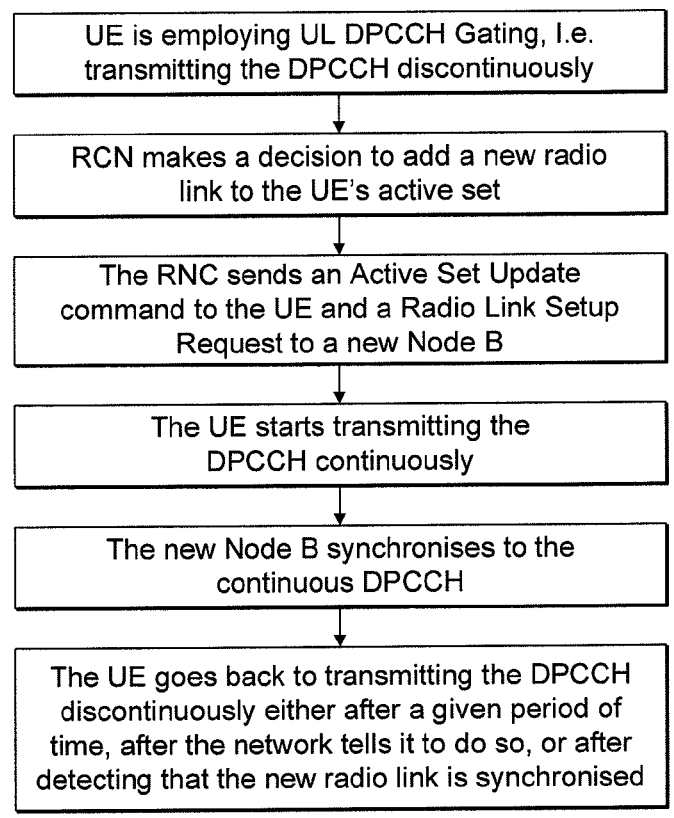
FIG. 4 shows an embodiment of the present invention indicating the flow of moving from discontinuous DPCCH transmission to continuous DPCCH transmission and back.

FIG. 4 illustrates an embodiment of the present invention indicating the flow of moving from discontinuous DPCCH transmission to continuous DPCCH transmission and back.

The invention can be implemented by the following process:

1) A user is in a discontinuous transmission mode, and a decision is made to expand the active set, or a new radio link is being set up in a discontinuous transmission mode when there is no existing radio links (i.e. establishing a first connection when there is no existing radio links and the active set is empty), by adding a link to a new Node-B or access point.

2) When receiving a message introducing a new radio link to the UE's active set, e.g. an Active Set Update message, the UE transmits the uplink continuously for a predetermined period of time, until the network informs the UE to use discontinuous uplink again, or when the synchronisation has been achieved. In particular, if a radio link to a Node-B or access point that did not have any previous radio links to this UE is added to the active set (new radio link is not added to any of the existing radio link sets, but to a new radio link set) the UE could start transmitting the uplink (DPCCH in WCDMA) continuously.

3) The new Node-B or access point conducts radio-link synchronization in the same manner as before with continuous uplink.

4) After a predetermined time period, or explicit or implicit notification from the network, the UE can switch back to discontinuous uplink. Alternatively, the continuous uplink will time-out and radio-link set-up will fail. After this happens the UE will also switch back to discontinuous uplink.

The aforementioned arrangement has the advantage that new radio link set-up can be conducted as it is done now. Existing hardware and software can support embodiments of the present invention.

The disadvantage is that the gains of discontinuous uplink are lost for the period of continuous transmission for this user. However, this is negligible since new radio links are not formed often and the synchronization process doesn't take very long. Furthermore, the gains achievable from the new radio link being established are available earlier due to faster synchronisation.

Embodiments of the present invention may form an integral part of the new UL DPCCH gating feature according to the WCDMA system.

The required data processing functions may be provided by means of one or more data processor entities. All required processing may be provided in the network elements and/or the user equipment. Appropriately adapted computer program code product may be used for implementing the embodiments, when loaded to a computer or processor. The program code product for providing the operation may be stored on and provided by means of a carrier medium such as a carrier disc, card or tape. A possibility is to download the program code product via a data network. Implementation may be provided with appropriate software in a network element or mobile user equipment.

While this invention has been particularly shown and described with reference to preferred embodiments, it will be understood to those skilled in the art that various changes in form and detail may be made without departing from the scope of the invention as defined by the appendant claims.

What we claim is:

1. A method comprising:
   in response to a decision to connect a user equipment to a first network element of a communications network via a first radio link, transmitting a signal continuously from the user equipment to the first network element via the first radio link to permit synchronization of the first radio link;
   causing a switch of the user equipment from continuous transmission of the signal to discontinuous transmission of the signal after the first radio link is synchronized,
   in response to a decision to connect the user equipment to a second network element of the communications network via a second radio link, transmitting the signal continuously from the user equipment to the second network element via the second radio link to permit synchronization of the second radio link; and
   then causing a switch of the user equipment from continuous transmission of the signal to discontinuous transmission of the signal after the second radio link is synchronized,
   wherein the user equipment receives an active set update message via the first radio link to cause the user equipment to transmit a continuous burst of signal of configurable duration to the second network element.

2. A method according to claim 1, wherein the signal is a dedicated physical control channel transmission.

3. A method according to claim 1, wherein the first and second network elements are Node B.

4. A method according to claim 1, wherein the user equipment continues to transmit the signal discontinuously to the first network element after connecting to the second network element.

5. A method according to claim 1, wherein the user equipment stores a list of the network elements to which it has an active connection, the list constituting an active set comprising the first network element, with the second network element being added to the list when the second radio link is set-up.

6. A method according to claim 1, wherein the user equipment stores a list of the network elements to which it has an active connection, the list constituting an active set, wherein a new network element is added to the list when a radio link to the new network element is set-up.

7. A method according to claim 6, wherein the user equipment monitors network elements for signal quality and adds or removes a network element from the list according to the signal quality based on decisions made by the communications network.

8. A method according to claim 6, wherein the user equipment is continuously connected to the network elements on the list.

9. A method according to claim 8, wherein the user equipment is continuously connected to the network elements on the list in enhanced dedicated channel (EDCH) mode.

10. A method according to claim 1, wherein the user equipment is informed by the communications network to initiate discontinuous transmission after synchronization is achieved.

11. A method according to claim 1, wherein if radio link set-up to the second network element fails, the user equipment switches back to discontinuous transmission.

12. A method according to claim 1, wherein the user equipment detects that the second radio link is synchronized and switches back to discontinuous transmission.

13. A method according to claim 1, wherein the discontinuous signal is a packet data transmission.

14. A method according to claim 1, wherein the synchronization comprises finger allocation in connection with radio link set-up.

15. A method according to claim 1, wherein a long channel impulse response measurement (IRM) is conducted during synchronization.

16. A method according to claim 15, wherein the IRM is a monoblock IRM.

17. A method according to claim 1, wherein the user equipment has a discontinuous transmission mode which is turned off before adding new radio links to an active set of the user equipment and on again when synchronization has been established.

18. A method of providing assistance for synchronization of radio links in a communications network comprising at least a first and second network element, wherein a user equipment is connected via a first radio link to the first network element to transmit a signal discontinuously thereto and wherein, in response to a decision to connect the user equipment to the second network element via a second radio link to transmit the signal thereto, the user equipment begins transmitting the signal continuously, the second radio link is synchronized, and then the user equipment switches to transmit the signal discontinuously after the second radio link is synchronized, wherein an active set update message is received by the user equipment via the first radio link to direct transmission of a continuous burst of signal of configurable duration to the second network element.

19. A method of providing assistance for synchronization of radio links in a communications network comprising at least a first and second network element, wherein a user equipment is connected via a first radio link to the first network element to transmit a signal discontinuously thereto and wherein, in response to a decision to connect the user equipment to the second network element via a second radio link to transmit the signal thereto, the user equipment begins transmitting the signal continuously, the second radio link is synchronized, and then the user equipment switches to transmit the signal discontinuously after the second radio link is synchronized, wherein the decision is to expand an active set by adding a link to the second network element, wherein an active set update message is received by the user equipment when the decision is made, and wherein the user equipment transmits the signal continuously for a predetermined time in response to the active set update message.

20. A method comprising:
in response to a decision to connect a user equipment of a communications network to a first network element via a first radio link, transmitting a signal utilizing a first transmission pattern from the user equipment to the first network element via the first radio link to permit synchronization of the first radio link;
causing a switch of the user equipment from transmission using the first transmission pattern to transmission of the signal using the second transmission pattern after the first radio link is synchronized,
in response to a decision to connect the user equipment to a second network element of the communications network via a second radio link, transmitting the signal from the user equipment utilizing the first transmission pattern to the second network element via the second radio link to permit synchronization of the second radio link; and
then causing a switch of the user equipment from transmission using the first transmission patter to transmission of the signal utilizing the second transmission pattern after the second radio link is synchronized,
wherein an active set update message is received by the user equipment via the first radio link to cause the user equipment to transmit a continuous burst of signal of configurable duration to the second network element.

21. A communications network comprising at least a first network element and a second network element, the communications network being configured to:
make a decision to connect a user equipment to the first network element via a first radio link to transmit a signal discontinuously thereto;
cause a message to be sent to the user equipment to transmit the signal continuously from the user equipment to the first network element via the first radio link;
synchronize the first radio link;
receive the signal discontinuously after the first radio link is synchronized;
make a decision to connect the user equipment to the second network element via a second radio link to transmit the signal thereto;
cause a message to be sent to the user equipment to switch to transmit the signal continuously;
synchronize the second radio link; and
receive the signal discontinuously after the second radio link is synchronized,
wherein an active set update message is caused to be sent to the user equipment via the first radio link to transmit a continuous burst of signal of configurable duration to the second network element.

22. A communications network according to claim 21, the communications network being configured to cause a message to be sent to the user equipment to switch to transmit the signal discontinuously after the first radio link is synchronized.

23. A communications network according to claim 21, the communications network being configured to cause a message to be sent to the user equipment to switch to transmit the signal discontinuously after the second radio link is synchronized.

24. A communications network according to claim 21, wherein the first network element is a Node B.

25. A communications network according to claim 21, the communications network being configured to make a decision to add or remove a network element from an active set based on signal quality information and to cause an active set update message to be sent to the user equipment when the decision is made.

26. A communications network according to claim 21, the communications network being configured to inform the user equipment to initiate discontinuous transmission after synchronization is achieved.

27. A communications network according to claim 21, wherein the synchronization comprises finger allocation in connection with radio link set-up.

28. A communications network according to claim 21, wherein a long channel impulse response measurement (IRM) is conducted during synchronization.

29. A communications network according to claim 28, wherein the IRM is a monoblock IRM.

30. A communications network according to claim 21, further comprising a radio network controller which is arranged to send the message to the user equipment via the first network element.

31. A communications network comprising at least a first network element and a second network element, the communications network being configured to:
make a decision to connect a user equipment to the first network element via a first radio link to transmit a signal utilizing a second transmission pattern thereto;
cause a message to be sent to the user equipment to transmit the signal utilizing a first transmission pattern from the user equipment to the first network element via the first radio link;
synchronize the first radio link;

receive the signal utilizing the second transmission pattern after the first radio link is synchronized;

make a decision to connect the user equipment to the second network element via a second radio link to transmit a signal utilizing a second transmission pattern thereto;

cause a message to be sent to the user equipment to switch to transmit the signal utilizing a first transmission pattern from the user equipment to the second network element via the second radio link;

synchronize the second radio link; and receive the signal utilizing the second transmission pattern after the second radio link is synchronized, wherein an active set update message is caused to be sent to the user equipment via the first radio link to transmit a continuous burst of signal of configurable duration to the second network element.

32. A radio network controller comprising at least one processor and computer program code stored in a medium comprised in the radio network controller, the computer program code being configured, when run on the at least one processor, to cause the radio network controller to at least:

make a decision to connect a user equipment to a network element via a radio link to transmit a signal discontinuously thereto;

cause a message to be sent toward the user equipment to transmit a continuous burst of signal of configurable duration to the network element or until the radio link is established;

make a decision to add a second network element to an active set based on signal quality information; and cause an active set update message to be sent toward the user equipment after the decision is made, wherein the active set update message is sent to the user equipment to transmit a continuous burst of signal of configurable duration to the second network element.

33. A radio network controller according to claim 32, the radio network controller being configured to inform the user equipment to initiate discontinuous transmission after synchronization is achieved.

34. A user equipment for use in a communications network, the user equipment comprising a processor and a carrier medium storing a computer program, the computer program configured to, when run on the processor cause the user equipment at least to:

receive a message from the communications network to set up a first radio link with a first network element;

transmit a signal continuously from the user equipment to the first network element via the first radio link while the first radio link is being synchronized; and switch to transmission of the signal discontinuously after the first radio link is synchronized, receive a message from the communications network to set up a second radio link with a second network element after having connected to the first network element;

transmit the signal continuously from the user equipment to the second network element via the second radio link while the second radio link is being synchronized; and switch to transmission of the signal discontinuously after the second radio link is synchronized, wherein the user equipment continues to transmit the signal discontinuously to the first network element after connecting to the second network element.

35. A user equipment according to claim 34, wherein the user equipment stores a list of the network elements to which it has an active connection, the list constituting an active set, wherein a new network element is added to the list when a radio link to the new network element is set-up.

36. A user equipment according to claim 35, wherein the user equipment is configured to monitor network elements for signal quality and add or remove a network element from the list according to the signal quality based on decisions made by the communications network.

37. A user equipment according to claim 35, wherein the user equipment is configured to be continuously connected to the network elements on the list.

38. A user equipment according to claim 37, wherein the user equipment is configured to be continuously connected to the network elements on the list in enhanced dedicated channel (EDCH) mode.

39. A user equipment according to claim 34, wherein if radio link set-up to the second network element fails, the user equipment is configured to switch back to discontinuous transmission.

40. A user equipment according to claim 34, configured to detect that the second radio link is synchronized and switch back to discontinuous transmission.

41. A user equipment according to claim 34, wherein the user equipment has a discontinuous transmission mode which is turned off before adding new radio links to an active set of the user equipment and on again when synchronization has been established.

42. A computer program product comprising a computer readable medium storing a computer program that, when executed, performs a method comprising:

in response to a decision to connect a user equipment to a first network element of a communications network via a first radio link, transmitting a signal continuously from the user equipment to the first network element via the first radio link to permit synchronization of the first radio link;

causing a switch of the user equipment from continuous transmission of the signal to discontinuous transmission of the signal after the first radio link is synchronized, in response to a decision to connect the user equipment to a second network element of the communications network via a second radio link, transmitting the signal continuously from the user equipment to the second network element via the second radio link to permit synchronization of the second radio link; and then causing a switch of the user equipment from continuous transmission of the signal to discontinuous transmission of the signal after the second radio link is synchronized, wherein an active set update message is received by the user equipment via the first radio link to cause the user equipment to transmit a continuous burst of signal of configurable duration to the second network element.

43. A computer program product comprising a computer readable medium storing a computer program that, when executed, performs a method comprising:

in response to a decision to connect a user equipment to a first network element of a communications network via a first radio link, transmitting a signal in accordance with a first transmission pattern from the user equipment to the first network element via the first radio link to permit synchronization of the first radio link;

causing a switch of the user equipment from transmission of the signal in accordance with the first transmission pattern to transmission of the signal in accordance with a second transmission pattern after the first radio link is synchronized;

in response to a decision to connect the user equipment to a second network element of the communications network via a second radio link causing transmission of the signal in accordance with the first transmission pattern from the user equipment to the second network element via the second radio link to permit synchronization of the second radio link; and then causing a switch of the user equipment from transmission of the signal in accordance with the first transmission pattern to transmission of the signal in accordance with a second transmission pattern after the second radio link is synchronized, wherein an active set update message is received by the user equipment via the first radio link to cause the user equipment to transmit a continuous burst of signal of configurable duration to the second network element.

* * * * *

UNITED STATES PATENT AND TRADEMARK OFFICE
CERTIFICATE OF CORRECTION

PATENT NO.       : 7,953,376 B2                                              Page 1 of 1
APPLICATION NO.  : 11/425256
DATED            : May 31, 2011
INVENTOR(S)      : Jaatinen et al.

It is certified that error appears in the above-identified patent and that said Letters Patent is hereby corrected as shown below:

Column 2
Line 44, "3GPP)" should read --(3GPP)--.

Signed and Sealed this
Second Day of October, 2012

David J. Kappos
*Director of the United States Patent and Trademark Office*